United States Patent
Clebsch et al.

(10) Patent No.: US 10,768,902 B2
(45) Date of Patent: Sep. 8, 2020

(54) ACTOR MODEL PROGRAMMING

(71) Applicant: Microsoft Technology Licensing, LLC, Redmond, WA (US)

(72) Inventors: Sylvan Wesley Clebsch, Cambridge (GB); Matthew John Parkinson, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/043,142

(22) Filed: Jul. 23, 2018

(65) Prior Publication Data
US 2020/0004510 A1    Jan. 2, 2020

(30) Foreign Application Priority Data
Jun. 28, 2018    (GB) .................................... 1810645

(51) Int. Cl.
 G06F 9/44    (2018.01)
 G06F 8/30    (2018.01)
 G06F 16/22    (2019.01)

(52) U.S. Cl.
 CPC .......... G06F 8/315 (2013.01); G06F 16/2228 (2019.01)

(58) Field of Classification Search
 CPC . G06F 9/546; G06F 9/485; G06F 8/30; G06F 8/314; G06F 8/443
 See application file for complete search history.

(56) References Cited

U.S. PATENT DOCUMENTS

| | | | |
|---|---|---|---|
| 2007/0277152 A1* | 11/2007 | Srinivasan | G06F 8/20 717/119 |
| 2009/0307712 A1* | 12/2009 | Young | G06F 9/546 719/313 |
| 2018/0052712 A1* | 2/2018 | Power | G06F 9/5005 |
| 2018/0268775 A1* | 9/2018 | Horneff | G09G 5/006 |

FOREIGN PATENT DOCUMENTS

EP    0178235 A1    4/1986

OTHER PUBLICATIONS

Bernstein, "Orleans: Distributed Virtual Actors for Programmability and Scalability",Mar. 24, 2014,pp. 13 (Year: 2014).*

(Continued)

*Primary Examiner* — Duy Khuong T Nguyen

(57) ABSTRACT

A method of operating a computer according to an actor model, the method comprising: defining a plurality of actors, each taking form of a data structure comprising respective data and one or more respective functions for operating on the respective data; generating a wrapped message to be transmitted from a transmitting actor to multiple recipient actors, the wrapped message comprising at least one constituent message, a sorted list of the recipient actors, and an index indicating an entry in the list, the index initially being set to indicate the first recipient actor in the list; transmitting the wrapped message from the transmitting actor to the first recipient actor in the list; each of the recipient actors, except the last in the list, upon receiving the wrapped message, advancing the index and forwarding the wrapped message to the next actor in the list as indicated by the advanced index.

20 Claims, 2 Drawing Sheets

(56) References Cited

OTHER PUBLICATIONS

Imam, et al.,"Savina—An Actor Benchmark Suite", In 4th International Workshop on Programming Based on Actors Agents & Decentralized Control, Oct. 20, 2014, pp. 67-80.

Dichev, Zachari, "Improving Akka Dispatchers", Retrieved from: https://scalac.io/improving-akka-dispatchers/, Jul. 20, 2017, 30 Pages.

"International Search Report and Written Opinion Issued in PCT Application No. PCT/US19/037405", dated Sep. 5, 2019, 15 Pages.

"Actors—Akka Documentation", Retrieved from: https://web.archive.org/web/20170826082814/https:/doc.akka.io/docs/akka/2.5.4/scala/actors.html, Aug. 26, 2017, 22 Pages.

"Actors as a Model of Concurrency", Retrieved from: https://www.pxtech.com/post.php?p=53, Retrieved on May 30, 2018, 4 Pages.

"Actors in Scala", Retrieved from: https://web.archive.org/web/20140209131613/https:/media.pragprog.com/titles/pb7con/Bonus_Chapter.pdf, Feb. 9, 2014, pp. 117-151.

"What is an Actor?—Akka Documentation", Retrieved from: https://web.archive.org/web/20170410224104/https:/doc.akka.io/docs/akka/2.5/general/actors.html, Apr. 10, 2017, 4 Pages.

Bharti, Roohi, "HIVE—An Agent Based Modeling Framework", In Master's Theses of San Jose State University, May 20, 2016, 114 Pages.

Erb, Benjamin, "Actor-based Concurrency", In Diploma Thesis released under a Creative Commons license, Apr. 24, 2013, 8 Pages.

Haller, et al., "Scala Actors: Unifying Thread-based and Event-based Programming", In Journal of Theoretical Computer Science, vol. 410, Issue 2-3, Feb. 6, 2009, pp. 202-220.

Johansson, et al., "Retaining Eficiency in an Embedded System while Introducing Lua as a means to Improve Maintainability: An Actor Model Approach", In Thesis of University of Gothenburg, May 2011, 22 Pages.

Kim, Wooyoung, "THAL: An Actor System for Efficient and Scalable Concurrent Computing", In Thesis of University of Illinious, Nov. 1997, 100 Pages.

Schippers, et al., "Towards an Actor-based Concurrent Machine Model", In Proceedings of 4th workshop on the Implementation, Compilation, Optimization of Object-Oriented Languages and Programming Systems, Jul. 6, 2009, pp. 4-9.

Sundresh, Sameer, "Request-based Mediated Execution", In Doctoral Dissertation of University of Illinois, Jan. 2009, 130 Pages.

* cited by examiner

ACTOR MODEL PROGRAMMING

BACKGROUND

The actor model is a mathematical model of concurrent computation that treats "actors" as the universal primitives of concurrent computation. An actor is a type of object (in the sense of object-orientated programming): it is a data structure comprising data and one or more functions for operating on that data. Actors may modify their own private state, but can only affect each other through messages between them. In response to a message that it receives, an actor can: make local decisions, create more actors, send more messages, and determine how to respond to the next received message. These tasks could be carried out in parallel. Recipients of messages are identified by an address, sometimes called a "mailing address". Thus an actor can only communicate with actors whose addresses it has. It can obtain those from a message it receives, or if the address is for an actor it has itself created. For example, electronic mail (e-mail) can be modelled as an actor system, with email accounts being modelled as actors and email addresses as actor addresses.

What characterises an actor over simply any object of an object-orientated programming is that an actor is run on only one thread at any given time.

Threads are portions of code which can, at least for a time, be run independently of one another, and which can be run concurrently or in parallel with one another. Concurrency refers to the case where threads are interleaved with one another through the same execution unit of a processor, thus providing an effectively simultaneous form of execution. Parallelism refers to the case where threads are executed truly simultaneously through different parallel execution units. In a given program or set of programs, two or more threads of the program may be run concurrently and/or in parallel at any one time, depending on the resources of the system.

Threads can take the form of hardware threads or software threads. In the case of hardware threads, the processor itself comprises hardware support for each thread, at least in the form a set of context registers for each of the threads that can be run concurrently or in parallel at any one time. Each set of context registers stores a program state of a respective thread, such as the program counter and operands. In the case of software threads, the concurrency or parallelism is achieved not (or not only) though hardware support for each thread, but rather the thread states are maintained at a higher level in software. Either way, in many cases the threads may be scheduled for execution by the operating system running on the computer system. The threads in question may comprise threads of the operating system itself or threads of one or more applications run on the operating system.

SUMMARY

Actor model programming has two key concepts: actors and messages. An actor is allowed to process at most one message at a time, and a message can be handled using only the state of a single actor. A given actor can only ever be manipulating its own internal state or processing as message from a single external actor at any one time. Only one actor can be affecting the state of a given actor at any one time. As an actor is only doing one thing at a time its internal state can be safely manipulated without requiring locks (instead, messages are queued until they can be processed).

However, this creates a restriction in terms of the types of programs that can be executed in an actor model. For example, it is very difficult (if not impossible) to build a transactional database using an actor model as the programmer is either required to implement locking on top of the model, or alternatively all of the data ends up in a single actor, which then harms the scaling of the application, as all data access effectively becomes single threaded. Implementing locking on top of the Actor model negates the benefits of the Actor model as it introduces the possibility of deadlocks.

To address such problems or similar, the present invention provides a message that can request multiple actors to perform operations at the same time. The restriction that an actor can be associated with at most one executing message at any given time is maintained, but now a message is handled using a single execution thread running with access to the state of one or more actors. This enables the system to be composed of much smaller actors and thus increase the concurrency or parallelism in the system.

According to one aspect disclosed herein, there is provided a method of operating a computer according to an actor model. The method comprises defining a plurality of actors, each taking form of a data structure comprising respective data and one or more respective functions for operating on the respective data. A wrapped message is generated to be transmitted from a transmitting one of the actors to multiple recipient ones of the actors. The wrapped message comprises at least one constituent message, a sorted list of the recipient actors, and an index indicating an entry in the list. The index is initially set to indicate the first recipient actor in the list. The wrapped message is transmitted from the transmitting actor to the first recipient actor in the list. Each of the recipient actors, except the last in the list, upon receiving the wrapped message, advances the index and then forwards the wrapped message to the next actor in the list as indicated by the advanced index.

According to another aspect disclosed herein, there is provided a method of programming a computer according to an actor model. The method comprises defining a plurality of actors, each taking form of a data structure comprising respective data and one or more respective functions for operating on the respective data. A transmitting one of the actors is programmed to generate a wrapped message destined for multiple recipient ones of the actors. The wrapped message comprises at least one constituent message, a sorted list of the recipient actors, and an index indicating an entry in the list. The index is initially set to indicate the first recipient actor in the list. The transmitting actor is programmed to transmit the wrapped message from the transmitting actor to the first recipient actor in the list. Each of the recipient actors, except the last in the list, is programmed so as upon receiving the wrapped message, to advance the index and then forward the wrapped message to the next actor in the list as indicated by the advanced index.

In embodiments the methods may comprise operations in accordance with any of the embodiments disclosed herein.

According to another aspect disclosed herein, there is provided software embodied on computer-readable storage for enabling the programming methods disclosed herein, the software comprising a compiler, interpreter or library comprising one or more dedicated functions or commands enabling the programming of the generation and transmission of the wrapped message by the transmitting actor, and the forwarding of the wrapped message by the recipient actors.

According to another aspect disclosed herein there is provided software (e.g. an operating system) embodied on a computer-readable medium and configured so as when run on one or more processors to perform operations in accordance with any of the methods disclosed herein.

According to another aspect disclosed herein, there is provided a computer system comprising one or more processors and memory comprising one or more memory units arranged to store code arranged to run on the one or more processors, the code being configured so as when run to perform operations in accordance with any of the methods disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments disclosed herein and to illustrate how such embodiments may be put into effect, reference is made, by way of example only, to the accompanying drawings in which.

DETAILED DESCRIPTION OF EMBODIMENTS

Figure 1:
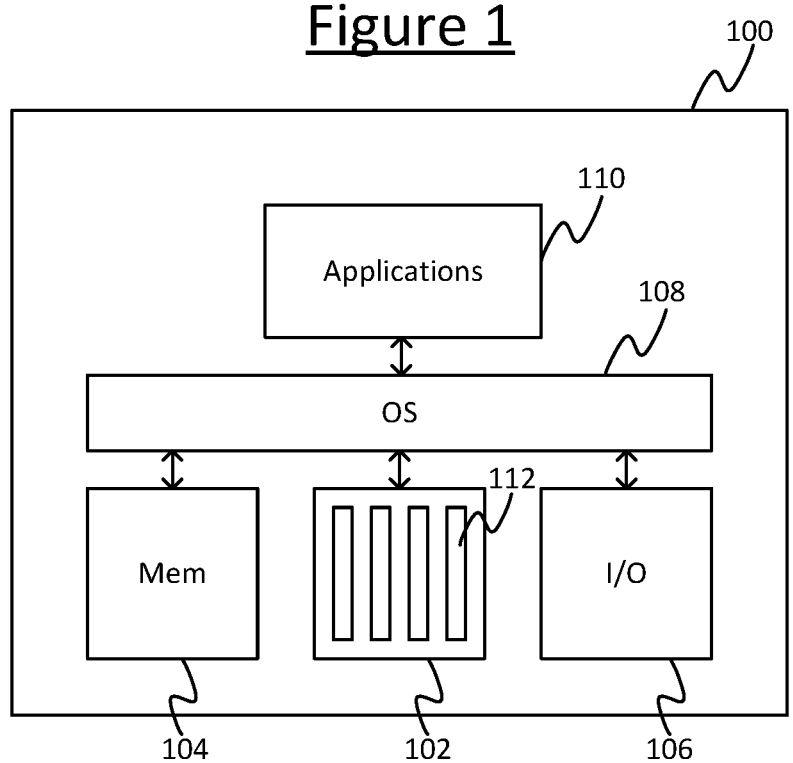
FIG. 1 is a schematic block diagram of a computer system.

FIG. 1 shows a computer system 100 in accordance with embodiments disclosed herein. The computer system 100 comprises: processing apparatus 102, memory 104, and one or more I/O devices 106. The memory 104 stores an operating system 108 and one or more applications 110. The operating system 108 is arranged to run on the processing apparatus 102, and the one or more applications 110 are arranged to run on the operating system 102 on the processing apparatus 102. The operating system 108 is configured to schedule the application(s) 110 for execution and to mediate access to the memory 104 and I/O resources 106 by the application(s) 110.

The memory 104 is also operable to store data to be accessed or operated on by the operating system 108 and/or application(s) 110, or to store data resulting from operations performed by the operating system 108 and/or applications 110. The memory 104 on which the operating system 108, application(s) 110 and data are stored may comprise one or more memory devices employing one or more memory media, e.g. electronic memory such as flash memory or a solid state drive (SSD); or a magnetic memory such as a hard-disk dive (HDD). Each of the operating system 108, applications 110 and data may be stored on a single memory device or distributed across multiple memory devices. The program code of the operating system 108 and applications 110 and data may be stored in different regions of the same one or more memory devices as the data, or on a different one or more memory devices than the data. Similarly, the operating system 108 may be stored in different regions of the same one or more memory devices as the applications 110, or a different one or more memory devices; and in the case of multiple applications 110 these may be stored in different regions of the same or more memory device, or some or all of them may be stored in different one or more memory devices than each other. The memory device(s) may be internal to the same housing as the processing apparatus or be external to it, or may comprise a combination of internal and external devices.

The processing apparatus 102 is arranged to run multiple concurrent or parallel threads 112. These may be threads of the operating system 108 itself and/or threads of one or more of the applications 110. The processing apparatus 102 on which the operating system 108 and application(s) 110 are run, including the threads 112, may comprises one or more processors comprising one or more cores. In the case of multiple processors these may be implemented on the same computer terminal or distributed across multiple computer units at multiple computer units at different locations, e.g. different chassis in the same data centre, different terminals on the same local area network, or different geographic locations networked together via a wide-area network such as the Internet.

For instance, the threads 112 may comprise: different threads on a same processor core, threads on different processor cores, threads on different cores on the same die or IC package, threads on different IC packages in the same board, threads on different boards connected together in a same data centre, threads on different devices connected together over a local-area and/or wide-area network (e.g. the Internet or a mobile cellular network such as a 3GPP network), or any combination of these. Note therefore that in some embodiments the operating system 108 may take the form of a distributed operating system. Also, in embodiments the memory 104 may comprise multiple memory devices distributed across multiple locations. Where desired, distributed computing techniques in themselves are known in the art.

An actor is an object (often described as an "active object") that is a unit of execution, and as such is stored in memory 104. An actor is run on a single thread at any given time and handles messages in sequence.

Figure 2:
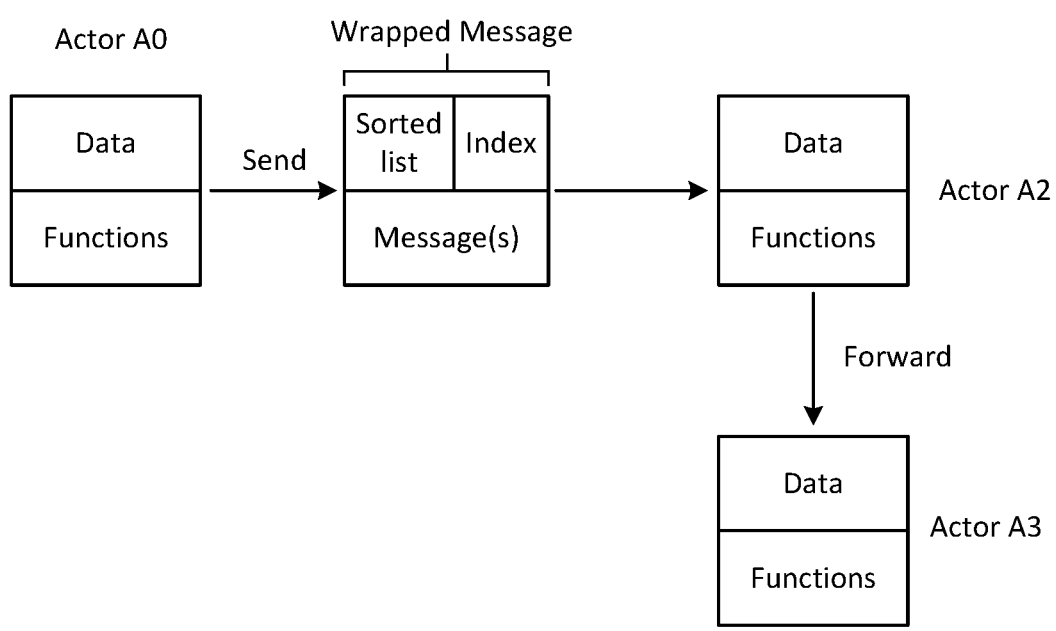
FIG. 2 schematically illustrates the flow of a wrapped message from a transmitting actor to recipients actors, and FIG. 3 also schematically shows the flow of a wrapped messages to recipient actors.

FIG. 2 shows the flow of a wrapped message 202 sent from a transmitting actor A0 via recipient actors A2 and A3.

Each actor within the defined actor model takes the form of a data structure comprising data 204 and one or more functions 206 for operating on that data. A wrapped message 202 is generated (e.g. by one of the actors) which will be transmitted from a transmitting actor A0. That is, the transmitting actor A0 is programmed to generate the wrapped message 202 destined for multiple recipient actors. The wrapped message 202 includes one or more constituent messages 208, a sorted list 210 of recipient actors, and an index 212 indicating an entry in the sorted list 210. The sorted list 210 may include one or more recipient actors. The actors may be sorted based on a memory address of the actors. The index 212 is initially set to indicate the first recipient actor in the sorted list 210.

For example, the transmitting actor may be actor A0. The transmitting actor may be a managing function. The sorted list may comprise recipient actors A2, A3, and A4, listed in that order. In this example, the index is initially set to indicate actor A2. Note that the index may in general indicate the recipient actor in any manner. Also note that the sorted list does not have to comprise contiguously numbered actors, nor does the list have to comprise actors numbered in ascending order. For example, the sorted list may contain actors A2, A5, A3, A6, and A4.

The wrapped message is transmitted from the transmitting actor (e.g. actor A0) to the first recipient actor in the sorted list (e.g. actor A2). That is, the transmitting actor is programmed to transmit the wrapped message to the first recipient actor in the list. When the first recipient actor receives the wrapped message, the first recipient actor increments the index to the next entry in the list. For example, if the list of recipient actors is A2, A3, and A4, the first recipient actor A2 would increment the index to the next entry which indicates actor A3. The first recipient actor forwards the wrapped message (with the incremented index) to the next recipient actor, i.e. the second recipient actor. The second recipient actor (e.g. actor A3) repeats the process of incrementing the index and forwarding the wrapped message to the next recipient actor. The process is repeated until the wrapped message is forwarded to and received by the last recipient actor in the sorted list.

The wrapped message, m', may take the form of (m, A*, i), where m is the constituent message(s), A* is the sorted list of recipient actors and i is the index. The constituent message m may be a function f(A*) that operates over the recipient actors.

The transmitting actor may itself be a recipient actor. For example, the wrapped message may be transmitted from the transmitting actor to one or more recipient actors in turn, and one of those recipient actors may forward the wrapped message back to the transmitting actor. For example, if the transmitting actor is actor A0, the sorted list of recipient actors may comprise actors A2, A4, A6, A0, and A3. Here, the transmitting actor A0 receives the wrapped message from actor A6 and forwards it, along with an incremented index, to actor A3. The transmitting actor may also be the last recipient actor.

Each actor, other than the last recipient actor in the list, is programmed such that as the wrapped message passes through said actor, that actor is prevented from processing any further inter-actor messages until all the actors in the list have processed the constituent message. An inter-actor message may be any message transmitted from one actor to another actor. That is, if an actor receives a wrapped message, it cannot receive a second message (wrapped message or otherwise) until all of the recipient actors have performed any actions defined in the constituent message. I.e. all but the last of the recipient actors may each be locked from receiving any further inter-actor messages until all the actors in the list have processed the constituent message.

Unlike prior implementations of the actor model in which an actor processes a message upon receiving said message, embodiments of the present invention introduces a new descheduled state, which effectively locks the actor from processing any further messages. The actor cannot leave the descheduled state until the wrapped message is received by all of the intended recipients. The descheduling is asynchronous in that each actor is descheduled at a different point in time, i.e. when it forwards the wrapped message to the next recipient actor.

In some examples, the constituent message may be a single constituent message for each of the recipient actors. That is, each recipient actor is sent the same constituent message to process. In other examples, the same constituent message may be sent to some but not all of the recipient actors. For example, recipient actors A2 and A3 may be sent the same constituent message, whereas recipient actor A4 receives a different constituent message. That is, the constituent message comprises multiple constituent messages. Each of the multiple constituent messages may be intended (and therefore sent) to one or more of the recipient actors. For instance, each recipient actor may receive its own specific constituent message. E.g. recipient actors A2, A3 and A4 may receive constituent messages M2, M3 and M4 respectively.

An actor is an object (often described as an "active object") that is a unit of execution, and as such is stored in memory 104. An actor is run on a single thread at any given time and handles messages in sequence. Actors are initially placed in a queue to be claimed for processing by one of a plurality of threads. Each actor may only be claimed by (and therefore run on) a single thread at a time. Each thread may have its own respective single-producer multi-consumer queue (SPMCQ) of actors. The thread is itself the producer for its own queue, but any other thread may claim an actor from that thread's queue by means of a message. I.e. each thread may claim an actor with pending messages from any other thread's SPMCQ. If an actor is claimed by a thread other than the thread that produced the queue in which the actor is initially placed, the actor may be run on multiple threads (e.g. multiple operating system threads). Here, the actor still processes messages in sequence such that it follows a logical "thread of execution". Different threads may claim different ones of the recipient actors. For example, thread T1 and T2 may claim recipient actors A2 and A4 respectively. A given thread may claim a plurality of recipient actors at the same time. In some examples, the transmitting actor may be claimed by a thread other than the thread(s) claiming the recipient actors.

The queue of actors for each thread is held in a part of the memory 104. The queue may be maintained by the individual respective thread, or centrally by another function (e.g. a supervising thread of the operating system 108 or the application 110).

Previous actor model programming has made the manipulation of databases using actors difficult. For example, one application of actor model programming could be to create a database program. In such a case, a first table for instance may map identifiers to employees' names and a second table may map the identifiers to the employees' jobs. Identifier 1 may map "Susan" to her job "Greengrocer". Actor A2 may be responsible for modifying the first table whilst actor A3 may be responsible for modifying the second table. In previous models, each actor operates on its respective tables in separate atomic transactions. This is adequate if one type of data entry is being changed, e.g. the names. However, it would be desirable to perform two different simultaneous changes of state in an actor model in a single atomic transaction, e.g. changing name and job title. To do this, a single message is generated that computes over the states of multiple actors (actors A2 and A3).

A wrapped message includes a sorted list of the recipient actors (A2 and A3) and an index initially set to the first recipient actor in the list (A2). Actor A2 receives the wrapped message from a transmitter actor (e.g. actor A0) and is locked, i.e. prevented from receiving another message. The wrapped message may comprise a first constituent message for actor A2. The first constituent message may cause actor A2 to change Susan's name to "Sue". Actor A2 advances the index to the next entry in the list, i.e. A3. The wrapped message is forwarded to the next recipient actor (i.e. from A2 to A3). The wrapped message may comprise a second constituent message for actor A3. The second constituent message may cause actor A3 to change the job mapped to Susan's ID to "Astronaut". When the last recipient actor A3 receives the wrapped message it knows it is the last recipient as the index has been advanced to an entry corresponding to that actor (i.e. to A3). Now, when each actor has performed the operations of its respective data, each recipient actor is rescheduled (or released) so that it can receive and process other messages. The sorted list ensures that actors can never deadlock the system. That is, no actor can receive more than one message.

Figure 3:
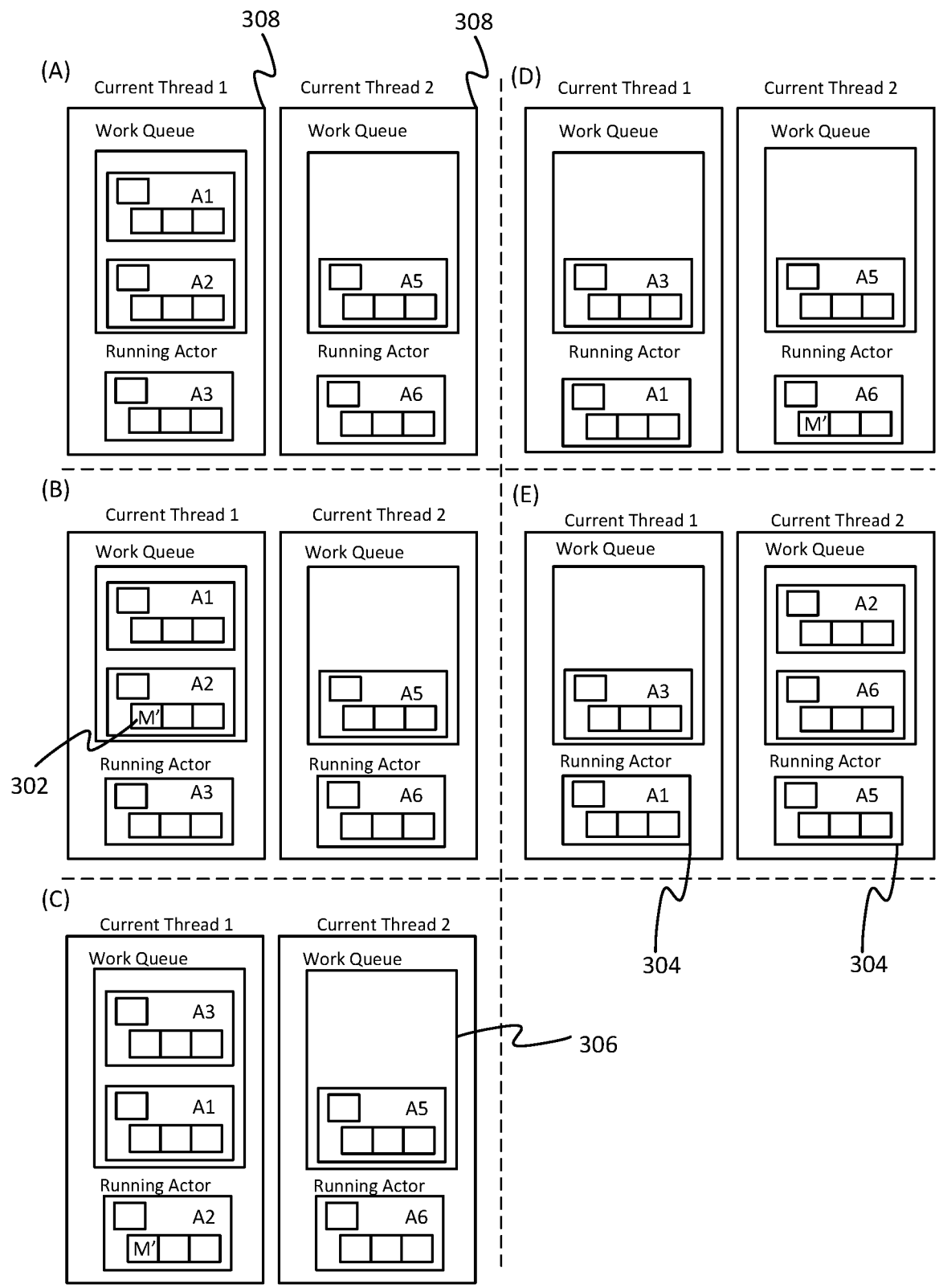

FIG. 3 illustrates the concept of when to reschedule an actor. FIG. 3 shows schematically the flow of a wrapped message 302 sent via multiple actors 304. Each actor may be placed in a queue 306 to be claimed for processing by one of a plurality of threads 308. In normal actor runtimes, once a message is processed on an actor it can immediately deal with a new message. Here, when processing a wrapped message (i.e. a multi-message), actors are not rescheduled after they have been acquired, but instead they are left in a "limbo state" waiting for the wrapped message to propagate through all the required recipient actors. To avoid deadlock, the invention ensures that actors are always acquired in a defined order.

In the example of FIG. 3, at (A) transmitting actor A3 is attempting to send a wrapped message M', that will acquire recipient actors A2 and A6. Let us assume that A2 is the first in the order of acquisition. The wrapped message M' includes a sorted list comprising recipient actors A2 and A6. The wrapped message also includes an index set to indicate the first recipient actor A2. At (B) the wrapped message has been transmitted to recipient actor A2 and therefore actor A3 may reschedule itself on the work queue. A3 can reschedule as it has not received an inter-actor message. Recipient actor A2 is taken out of the work queue (i.e. claimed by thread 1) to execute a constituent message of the wrapped message. At (C), actor A2 processes its constituent message and forwards the wrapped message to the next recipient actor in the sorted list. In this example, the next recipient actor is actor A6. Before forwarding the wrapped message to actor A6, actor A2 advances the index to correspond with the next recipient actor in the sorted list. At (D), rather than actor A2 rescheduling itself, it instead gets the current thread to schedule a new actor (i.e. actor A6), and does not add itself to the work queue. This prevents actor A2 from being claimed by a thread. Now, the second thread processes the constituent message intended for actor A6, and can execute safely with the internal state of both actors A2 and A6. Since the index corresponds to the last actor in the sorted list of recipient actors, recipient actor A6 knows that it is the last actor and does not need to forward the wrapped message to another actor. At (E), once actors A2 and A6 have finished processing their constituent message(s), both actors are rescheduled in the work queue to be claimed by threads, and the system can start processing messages for a new actor (e.g. actor A1).

It will be appreciated that the above embodiments have been described by way of example only. Other applications or variants of the disclosed techniques may become apparent to a person skilled in the art given the disclosure herein. The scope of the present disclosure is not limited by the above-described embodiments but only by the accompanying claims.

The invention claimed is:

1. A method of operating a computer according to an actor model, the method comprising:
   defining a plurality of actors, each taking form of a data structure comprising respective data and one or more respective functions for operating on the respective data;
   generating a wrapped message to be transmitted from a transmitting one of the actors to multiple recipient ones of the actors, the wrapped message comprising at least one constituent message, a sorted list of the recipient actors, and an index indicating an entry in the list, the index initially being set to indicate a first recipient actor in the list;
   transmitting the wrapped message from the transmitting actor to the first recipient actor in the list;
   each of the recipient actors, except the last in the list, upon receiving the wrapped message, advancing the index and then forwarding the wrapped message to the next actor in the list as indicated by the advanced index;
   matching each of the recipient actors to one or more constituent messages of the at least one constituent message; and
   each respective recipient actor, of the recipient actors, performing at least one function of the one or more respective functions on at least some of the respective data based on the one or more constituent messages matched to the respective recipient actor, wherein all but the last of the recipient actors are each locked from receiving any further inter-actor messages until all the actors in the list have processed the constituent message.

2. The method of claim 1, wherein the actors are initially placed in a queue to be claimed for processing by one of a plurality of threads, each actor being claimed by only one of the threads, at least at any one time.

3. The method of claim 2, including enabling different threads to claim different ones of the recipient actors at a given time.

4. The method of claim 3, including enabling a different thread to claim the transmitting actor than the thread or threads claiming the recipient actors at a given time.

5. The method of claim 2, wherein the queue is a single producer, multiple consumer queue.

6. The method of claim 2, wherein the threads are operating system threads.

7. The method of claim 2, wherein the threads comprise multiple threads of a database program.

8. The method of claim 2, wherein the threads comprise different threads on a same processor core.

9. The method of claim 2, wherein the threads comprise threads on different processor cores.

10. The method of claim 9, wherein the threads comprise threads on different cores on the same die or integrated circuit (IC) package.

11. The method of claim 9, wherein the threads comprise threads on different IC packages in the same board.

12. The method of claim 9, wherein the threads comprise threads on different boards connected together via the same storage fabric in a same data centre.

13. The method of claim 1, wherein the at least one constituent message comprises multiple constituent messages, one for each of some or all of the multiple recipient actors.

14. The method of claim 1, wherein the at least one constituent message comprises a same constituent message for each of some or all of the multiple recipient actors.

15. The method of claim 1, wherein the transmitting actor is also a recipient actor of the wrapped message.

16. One or more computer memories of a computer system programmed to perform a method of operating a computer according to an actor model, the method comprising:
   defining a plurality of actors, each taking form of a data structure comprising respective data and one or more respective functions for operating on the respective data;

generating a wrapped message to be transmitted from a transmitting one of the actors to multiple recipient ones of the actors, the wrapped message comprising at least one constituent message, a sorted list of the recipient actors, and an index indicating an entry in the list, the index initially being set to indicate a first recipient actor in the list;

transmitting the wrapped message from the transmitting actor to the first recipient actor in the list;

each of the recipient actors, except the last in the list, upon receiving the wrapped message, advancing the index and then forwarding the wrapped message to the next actor in the list as indicated by the advanced index;

matching each of the recipient actors to one or more constituent messages of the at least one constituent message; and each respective recipient actor, of the recipient actors, performing at least one function of the one or more respective functions on at least some of the respective data based on the one or more constituent messages matched to the respective recipient actor, wherein all but the last of the recipient actors are each locked from receiving any further inter-actor messages until all the actors in the list have processed the constituent message.

17. The one or more computer memories of the computer system programmed according to claim 16, wherein the at least one constituent message comprises multiple constituent messages, one for each of some or all of the multiple recipient actors.

18. A method of programming a computer according to an actor model, the method comprising:

defining a plurality of actors, each taking form of a data structure comprising respective data and one or more respective functions for operating on the respective data;

programming a transmitting one of the actors to generate a wrapped message destined for multiple recipient ones of the actors, the wrapped message comprising at least one constituent message, a sorted list of the recipient actors, and an index indicating an entry in the list, the index initially being set to indicate a first recipient actor in the list;

programming the transmitting actor to transmit the wrapped message from the transmitting actor to the first recipient actor in the list;

programming each of the recipient actors, except the last in the list, so as upon receiving the wrapped message, to advance the index and then forward the wrapped message to the next actor in the list as indicated by the advanced index;

matching each of the recipient actors to one or more constituent messages of the at least one constituent message; and each respective recipient actor, of the recipient actors, performing at least one function of the one or more respective functions on at least some of the respective data based on the one or more constituent messages matched to the respective recipient actor, wherein all but the last of the recipient actors are each locked from receiving any further inter-actor messages until all the actors in the list have processed the constituent message.

19. One or more memory devices including computer executable code embodied thereon, the computer executable code comprising a compiler, interpreter or library comprising one or more dedicated functions or commands, wherein the computer executable code is configured to cause a computer system to perform a method of:

defining a plurality of actors, each taking form of a data structure comprising respective data and one or more respective functions for operating on the respective data;

programming a transmitting one of the actors to generate a wrapped message destined for multiple recipient ones of the actors, the wrapped message comprising at least one constituent message, a sorted list of the recipient actors, and an index indicating an entry in the list, the index initially being set to indicate a first recipient actor in the list;

programming the transmitting actor to transmit the wrapped message from the transmitting actor to the first recipient actor in the list;

programming each of the recipient actors, except the last in the list, so as upon receiving the wrapped message, to advance the index and then forward the wrapped message to a next actor in the list as indicated by the advanced index;

matching each of the recipient actors to one or more constituent messages of the at least one constituent message; and each respective recipient actor, of the recipient actors, performing at least one function of the one or more respective functions on at least some of the respective data based on the one or more constituent messages matched to the respective recipient actor, wherein all but the last of the recipient actors are each locked from receiving any further inter-actor messages until all the actors in the list have processed the constituent message.

20. The one or more memory devices including the computer executable code of claim 19, wherein the at least one constituent message comprises multiple constituent messages, one for each of some or all of the multiple recipient actors.

* * * * *